Feb. 2, 1971    S. FREUND    3,559,483
FLOW METER
Filed June 10, 1968    2 Sheets-Sheet 2
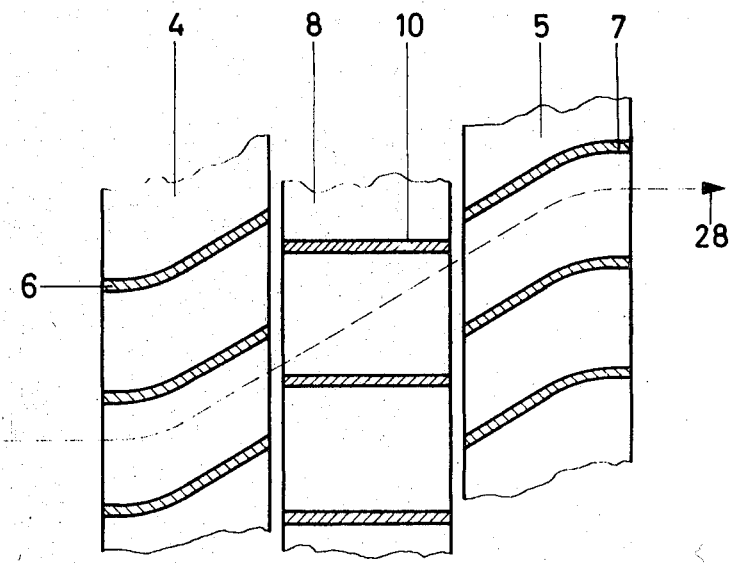
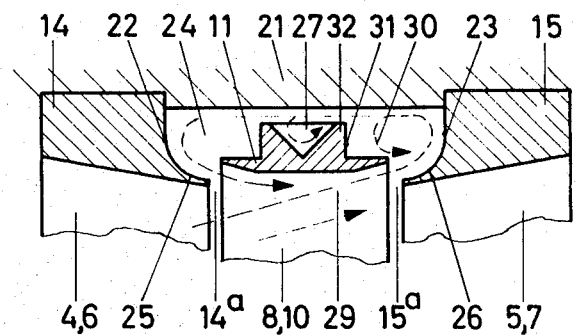
INVENTOR
SIEGFRIED FREUND
BY
ATTORNEYS

United States Patent Office 3,559,483
Patented Feb. 2, 1971

3,559,483
FLOW METER
Siegfried Freund, Rheinfelden, Germany, assignor to Endress & Hauser GmbH & Co., Baden, Germany
Filed June 10, 1968, Ser. No. 735,917
Claims priority, application Switzerland, June 12, 1967, 8,382/67
Int. Cl. G01f 1/00
U.S. Cl. 73—231                                                 5 Claims

ABSTRACT OF THE DISCLOSURE

A flow meter is formed of a tubular member providing a flow passageway which contains a pair of stationary guide members disposed on the opposite sides of a rotor. Vanes are provided in the guide members for the directing the flow of fluid into and away from the rotor. Disposed about the circumferential periphery of the rotor is an annular chamber arranged to provide an opposing force on the rotor to counterbalance the force exerted on it in the downstream direction. Further, cavities are provided in the peripheral surface of the rotor which form vortex chambers communicating with the fluid flow through the annular chamber for establishing turbulent flow therein. The turbulent flow compensates for the effects of viscosity on the rotor.

SUMMARY OF THE INVENTION

The present invention is directed to a flow meter for the dynamic measurement of a fluid, and more particularly, it is concerned with stationary guide means positioned on the opposite sides of a vaned rotor for conducting the flow of fluid into and away from the rotor and with an annular chamber formed about the rotor.

In flowing measuring apparatus employing rotors, also known as turbine flow meters, the principle of operation is essentially based on the angular speed of the rotor set in rotation by the flow of fluid through the apparatus. The angular speed of the rotor is utilized in determining the rate of flow.

In such flow meters the rotor is considered as a screw propeller having an angular speed N which is proportional to the flow velocity V. The equation $$V = N \times H$$

applies, where H is the pitch of the screw. On the basis of the continuity law the relationship $$Q = F \times V$$

can be written for the rate of flow Q, F representing a cross section. It follows that the rate of flow Q is proportional to the angular speed N.

In previously known flow meter constructions employing rotary screws the flow on the input side is directed parallel to the axis. The fluid impinges on the vanes of the screw which are inclined to the direction of flow, and the fluid continues to flow from the output side of the screw in parallel relationship with the axis. In this case the kinetic magnitude $$A = M \times V$$

represents a considerable axial pressure on the rotor in the direction of flow, if M is the mass of the volume flowing and V is the velocity of flow. These axial forces directed downstream, that is, the direction of flow of the fluid, act adversely on the rotary movement of the rotor, and the frictional forces in the thrust bearing on the output side of the rotor are correspondingly high. Further, the bearing is subjected to wear, particularly where the flow through the meter is at high flow velocities. Moreover, foreign matter flowing in the fluid can become caught in the bearing and as a result, the rotation of the rotor is impaired. The construction of such rotors having inclined vanes requires considerable care and the balancing of the rotor, which is not an easy task, in indispensible.

In the past a number of attempts have been made to reduce the undesired axial forces on the rotor and to meet the rigid construction requirements imposed by the need for accuracy in measurement. As a result, it has been proposed to provide pressure fields between the rotor hub and the hub of the bearing support based on the direction of flow of the fluid. By damming flow on the output side and affording a suction effect on the input side a force is produced which is directly opposite to the axial pressure is relatively small and on the other hand, the rotor. However, this proposal has no real practical significance because on one hand the hub surface for the static pressure is realtively small and on the other hand, the rotor has a considerable mass correspodning to the length of the rotor wheel.

Accordingly it is the primary object of the present invention to provide a turbine flow meter construction in which the axial forces acting on the rotor in the downstream direction are compensated.

Another object of the invention is to provide stationary guide members on the opposite sides of the rotor to prevent foreign material entering the bearings of the rotor. Additionally, the guide members are provided with vanes for properly converting the direction of flow into and away from the rotor for effecting proper measuring operations.

Still another object of the invention is to provide an annular chamber disposed about the circumferential periphery of the rotor in which forces are established for counterbalancing the forces directed in the downstream direction against the rotor.

A further object of the invention is to provide vanes in the rotor extending radially from its axis, while the vanes in the guide members have a screw-type configuration.

Moreover, another object of the invention is to form cavities in the circumferential periphery of the rotor in communication with the annular chamber about the rotor for establishing a rotating ring of liquid which compensates for the effects of viscosity on the rotor.

Yet, another object of the invention is to provide a rotor structure which is simple in construction, economical in cost and efficient in operation.

Therefore, in the present invention a tubular member is arranged to provide a flow passageway containing a housing having an inlet side and an outlet side. A vaned rotor is rotatably mounted in the housing and a stationary guide member is positioned on each of the inlet and outlet sides of the rotor. The rotor has radial vanes extending between a hub and a rotor ring which forms the circumferential periphery of the rotor. On either side of the rotor the guide members are formed of an axially disposed hub or screening member and an outer ring secured to the housing in the tubular member. Disposed between the hub and the outer ring of the guide members are guide vanes angularly disposed with respect to the axial flow through the tubular member. The outer surface of the rotor ring in combination with the oppositely disposed surface of the housing and the adjacent end surfaces of the outer rings of the guide members forms an annular chamber having inlet and outlet openings in communication with the flow passageway through the tubular member. The upstream and downstream edges of the rotor ring have a larger inside diameter than the adjacent edges of the outer rings of the guide members and this arrangement diverts flow into the annular chamber through the gap between the edge of the rotor ring and the adjacent edge of the outer ring of the guide member located on the downstream or outlet side of the rotor. At the upstream face of the rotor an annular gap is formed between the adjacent surfaces of the rotor ring and the outer ring of the guide member which acts as an outlet for flow from the annular chamber back into the flow passageway. The flow directed into the annular chamber develops forces acting in opposition to the dynamic pressure exerted on the rotor by the flow of fluid through the flow passageway.

In the specific embodiment of the flow meter disclosed herein the guide members have similar screw-like blading or vanes which impart a stabilizing angular momentum to the flow of fluid on the inlet side of the rotor and after passage of the fluid through the rotor the other guide member directs the fluid in an axially directed path. Further, the rotor vanes are rectilinear and are disposed in planes extending through the axis of the tubular member. In an alternate embodiment of the rotor its vanes are provided with a curved shape and extend in a generally radial direction.

In the preferred embodiment of the invention a plurality of individual vortex chambers are provided on the outer surface of the rotor ring and form pockets which interrupt the profile of the flow of fluid passing through the annular chamber. These chambers form a ring of fluid rotating with the rotor and hence bring about a reduction in the influence developed by variations in viscosity on the rotor. The laminar flow profile of a viscous medium is flattened and converted into a profile having velocity vectors of almost equal size, so that the exact determination of the average velocity of flow is possible.

Due to the arrangement of the vanes in the guide members, the flow which may be unstable and irregular is converted into an orderly rotating and stabilized flow. Moreover, the twist or rotation imparted to the fluid flow causes any foreign matter carried in the fluid to be forced outwardly away from the hub of the rotor thereby avoiding the possibility of any fouling of the thrust bearing of the rotor. Further, the manufacture of screw-like vanes for stationary guide members does not require the same narrow tolerances that are needed for the screw-like blades of rotors.

As a result of the static pressure within the annular chamber about the rotor and the pressure field established in opposition to the axial pressure exerted by the flow of fluid through the rotor, the axially directed forces are counterbalanced to a considerable degree. Moreover, because of this balancing effect the bearing members for the rotor, which are located in the hubs of the guide members, may be of a relatively simple construction. Because of the simple and inexpensive nature of the construction of the rotor there is no special care required in the formation of its straight vanes and it may be made of a light structure which does not require narrow tolerances.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 2 is a diagrammatical illustration of the flow of fluid through the flow meter; and FIG. 3 is an enlarged sectional detail of a portion of the flow meter shown in FIG. 1.

DETAILED DESCRIPTION OF THE PREFERRED EMBODIMENT

Figure 1:
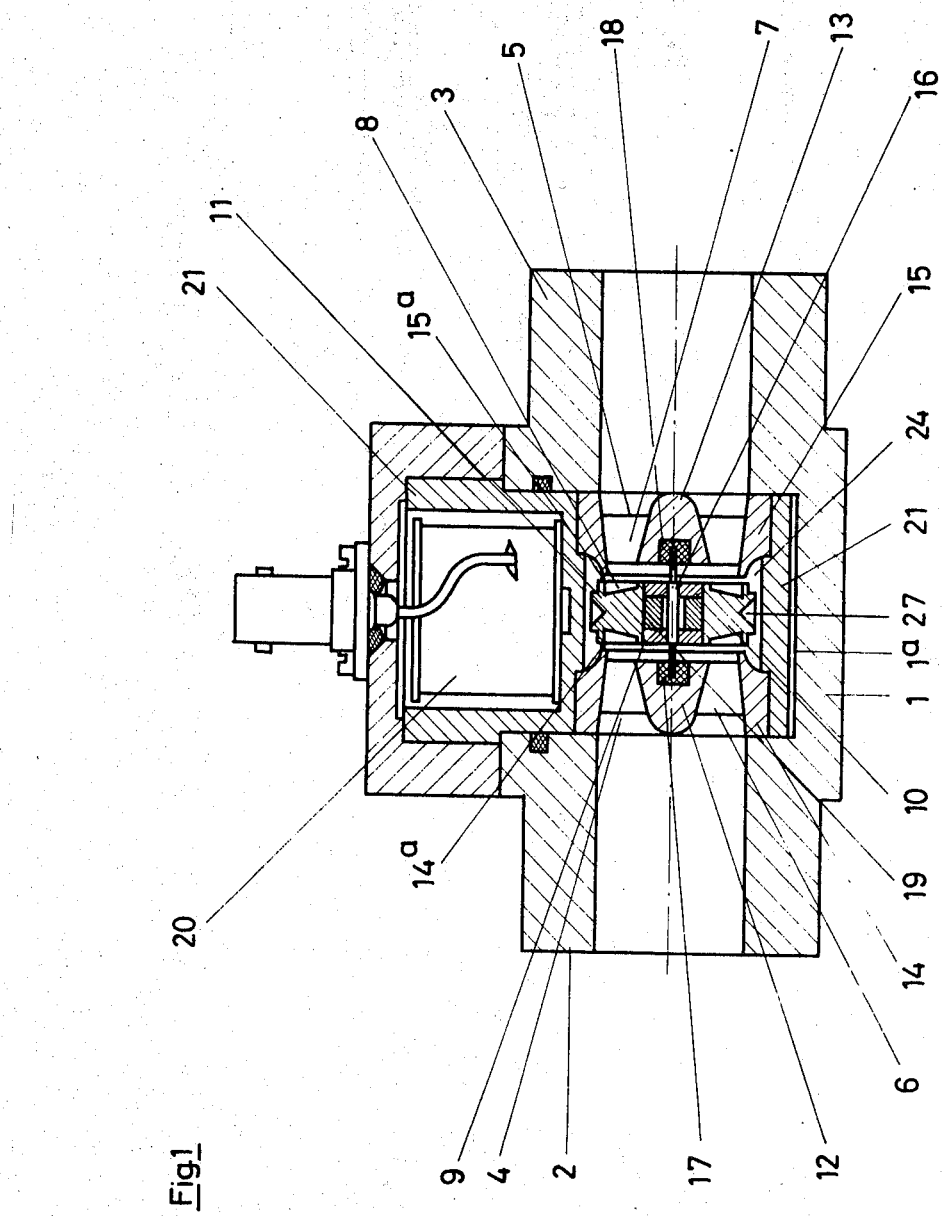
FIG. 1 is a longitudinal sectional view through a flow meter embodying the present invention.

In FIG. 1 a flow meter is illustrated comprised of a tubular member 1 having connection pieces 2 and 3 at its opposite ends for connecting the flow meter into a conduit. For the purposes of this description the connection piece 2 will be considered as the inlet end and the connection piece 3 as the outlet end of the tubular member.

In the portion of the tubular member between its connection 2 and 3 a central recessed section 1a is provided containing a housing 21. As stationary guide member 4, 5 is positioned in each of the inlet and outlet ends of this central portion and is secured about its outer surface into the housing 21. Extending transversely across the flow passageway through the tubular member 1 between the guide members 4 and 5 is a rotor 8 formed of a centrally or axially disposed hub 9 supporting a plurality of radially extending vanes 10 disposed in planes extending through the axis of the tubular member. The outer ends of the vanes 10 are secured to a rotor ring 11 concentrically disposed about the hub 9.

As can be seen in the drawing the guide members 4 and 5 are identical in construction and in combination with the rotor form a structural unit which is symmetrical and can serve for measuring flow passing in either direction through the tubular member. Each of the guide members contains an axially located, generally conically shaped hub or screen member 12, 13 and a concentric outer ring 14, 15 respectively, spaced outwardly from the hub with vanes 6 and 7 respectively, extending between the hub and the inner surface of the outer ring. Preferably, the hub the vanes and the outer ring are formed as a single unit.

The rotor 8 rotates about its axle 16 which is supported at its opposite ends in a pair of bearings 17, 18, each located in one of the hubs 12 and 13.

Within the hub 9 an annular magnet 19 extends about the axle 16 of the rotor and cooperates with a pulse coil located in the housing 21. When the rotor is caused to rotate a current is induced in the coil 20 by the reduction in reluctance. The pulses emanating from the coil may, for example, be amplified in an amplifier, not illustrated, and used for the direct measurement of flow by means of a Schmitt trigger arrangement followed by a converter.

The rotor ring 11 is spaced inwardly from the inner surface of the housing 21 and combines with the housing and the adjacent end surfaces 22, 23 of the outer rings 14 and 15 to form an annular chamber 24. The end surfaces 22, 23 of the outer rings in the annular chamber 24 have a curved configuration and are disposed in diverging relationship from the inner to the outer surfaces of the rings. The portion of the outer rings adjacent the rotor ring have an inside diameter which is somewhat smaller than the inside diameter of the rotor ring 11. This arrangement provides a projecting rim portion 25, 26 on each of the outer rings 14, 15 adjacent the rotor ring, see FIG. 3. In addition, a small annular gap 14a, 15a is provided between each of the outer rings 14, 15 and the rotor ring providing openings between the annular chamber 24 and the flow passageway through the tubular member 1. These annular gaps 14a, 15a facilitate the flow of the fluid into and out of the annular chamber. The annular gap 15a provides the inlet into the annular chamber 24 and the other annular gap 14a forms the outlet.

Disposed about the circumferential periphery of the rotor ring 11 are a plurality of cavities 27 which compensate, to a considerable degree, for the effects of viscosity on the rotor. With increasing viscosity a conical flow profile forms in the tubular member so that the flow vectors in the center of the member are larger than at its walls. In order to flatten the flow profile the boundary layer is interrupted in a known manner by means of annular grooves. This principle is also employed in the case of cavities 27 in the annular chamber which act as vortex chambers to interrupt the boundary layer and form a rotating ring of liquid which produces a torque inversely proportional to the Reynold's number and affords the desired compensation for viscosity. Moreover, the annular gaps 14a, 15a between the rotor ring and the rim portions 25, 26 of the outer rings 14, 15, likewise, may be considered as annular grooves which assist in compensating for the effects of viscosity.

In FIG. 2 the flow path of fluid passing from the inlet to the outlet ends of the tubular member is indicated by the arrow 28. As the fluid enters the first guide member 4 and flows over its curved vanes 6 the fluid receives a stabilizing twist which also tends to suppress turbulence. As the fluid continues from the guide member 4 it passes into the rotor and impinges upon the straight radial vanes 10 and imparts a torque to the rotor causing it to rotate about its axis 16. After leaving the rotor the fluid flows through the curved vanes in the guide member 5 and in converted back into an axially directed path and as it flows through the connection 3 it has a rotational movement about the axis of the tubular member.

The balancing effect of the various axial forces acting on the rotor and the compensation for viscosity of the fluid flowing through the rotor will be explained briefly with reference to FIG. 3. It will be noted that as flow passes through the rotor a portion 29, note the dotted line in FIG. 3 flows outwardly toward the outlet end of the rotor 8 and passes through the annular gap 15a into the annular chamber 24. Within the annular chamber the fluid forms an eddy 30 at the surface 31 of the radially outwardly extending central part 32 of the rotor ring 11. The force developed in the annular chamber 24 resulting from the effect of damming up the fluid acts in opposition to the pressure due to flow which is exerted on the rotor 8 and balances the axial thrust on the rotor. Further, when sudden changes occur in the velocity of the fluid flow through the tubular member the axial movement of the rotor 8 is damped to a considerable degree, and as a result, the bearing of the rotor on its outlet side is protected from damage.

As the fluid circulates in the annular chamber 24 from the high pressure side to the suction side a portion is entrained in the cavities 27, which act as vortex chambers, and an entrained ring of fluid is formed which in certain regions brings about a reduction in the effect of variations in viscosity on the rotor. As the fluid flows past the annular gap between the rim portion 25 and the adjacent edge of the rotor ring 11 a suction effect is developed which withdraws the fluid from within the annular chamber so that a continuous circulation within the annular chamber is automatically ensured.

While a specific embodiment of the invention has been shown and described in detail to illustrate the application of the inventive principles, it will be undesrtood that the invention may be embodied otherwise without departing from such principles.

What is claimed is:

1. A flow meter comprising a tubular member forming an axially extending flow passageway, a rotor disposed within and extending transversely of said flow passageway and having an inlet side and an outlet side, said rotor comprising a hub axially arranged within said tubular member, angularly spaced vanes extending radially outwardly from said hub, and a ring attached to and extending about the radially outer ends of said rotor vanes, the circumferential periphery of said rotor ring spaced inwardly from the inner surface of said tubular member, means for rotatably mounting said rotor within said tubular member, guide means disposed in said passageway on the inlet and outlet sides of said rotor and arranged to impart a twist to the fluid flowing into said rotor from said inlet side and to impart an axially directed flow characteristic to the fluid as it passes from said rotor on the outlet side thereof, said guide means comprising a pair of transversely arranged axially spaced stationary guide members, one of said guide members disposed on the inlet side of said rotor and the other said guide member disposed on the outlet side thereof, each of said guide members comprises an axially positioned hub, a ring member concentrically disposed about and spaced outwardly from said hub, the outer surface of said ring member secured in contacting engagement with the inner surface of said housing, and a plurality of stationary vanes extending between said hub and said ring member, said guide member vanes having a curved configuration and being inclined relative to the axis of said tubular member for converting the direction of flow at the inlet and outlet sides of said rotor, said ring member having an inside diameter at the sides thereof adjacent said rotor ring which is smaller than the inside diameter of the adjacent edge of said rotor ring, the transverse surface of said ring member adjacent said rotor ring having a concave curved configuration in a longitudinal vertical plane of said tubular member and disposed in diverging relationship from the radially inner edge to the radially outer edge of said ring member, the inner circumferential surface of said ring member disposed in diverging relationship as said ring member extends axially from said rotor ring, the radially outer periphery of said rotor ring, the oppositely disposed surface of said housing, and the curved transverse surfaces of said ring members adjacent said rotor ring form an annular chamber about said rotor, the spaced adjacent inner circumferential edges of said rotor ring and said ring members forming a pair of axially spaced annular shaped gaps providing an inlet opening and an outlet opening between the flow passageway through said tubular member and the annular chamber, with the downstream edge of said ring member forming the inlet opening by providing an inward projection into the flow passageway so that fluid flowing therethrough is directed into the annular chamber where the curved configuration of the transverse surface of said ring member effects an eddy action adjacent the inlet opening which directs a force against said rotor opposite in direction to the force on said rotor due to flow through the flow passageway and the upstream edge of said ring member forming the outlet opening by providing an inward projection into the flow passageway and the flow of fluid through the flow passageway past the outlet opening effects a suction for withdrawing fluid from the annular chamber and thereby providing circulation through the annular chamber from the inlet to the outlet openings.

2. A flow meter, as set forth in claim 1, wherein said means for rotatably mounting said rotor comprising a bearing located in each of said hubs of said guide members, and an axially extending axle for said rotor mounted at its opposite ends in said bearings in said hubs of said guide members.

3. A flow meter, as set forth in claim 2, where the circumferential surface of said hubs of said guide members are arranged in diverging relationship in the direction of said rotor, and the ends of said hubs adjacent said rotor have a diameter at least equal to the diameter of said rotor hub for forming a screening element for said rotor hub.

4. A flow meter, as set forth in claim 1, wherein the outer peripheral surface of said rotor ring has a plurality of regularly spaced cavities formed therein in communication with the annular chamber about said rotor ring and said cavities arranged to act as vortex chambers for establishing a turbulent effect for the fluid flowing within the annular chamber for compensating for the effects of viscosity on said rotor.

5. A flow meter as set forth in claim 1, wherein a pulse coil is mounted on the outer surface of said housing, an annular magnet disposed about the axle of said rotor and cooperating with said pulse coil for measuring the quantity of flow through the flow passageway.

References Cited

UNITED STATES PATENTS

| | | | |
|---|---|---|---|
| 3,232,110 | 2/1966 | Li | 73—231 |
| 3,248,944 | 5/1966 | Karlby et al. | 73—231 |
| 3,344,666 | 10/1967 | Rilett | 73—231 |

FOREIGN PATENTS

| | | | |
|---|---|---|---|
| 1,054,891 | 1/1967 | Great Britain | 73—231 |
| 1,008,508 | 10/1965 | Great Britain | 73—231 |

JAMES J. GILL, Primary Examiner

M. SMOLLAR, Assistant Examiner

U.S. Cl. X.R.

73—231